US008109529B2

(12) United States Patent
Rand et al.

(10) Patent No.: US 8,109,529 B2
(45) Date of Patent: Feb. 7, 2012

(54) ERGONOMIC WHEELCHAIR PROPULSION SYSTEM

(76) Inventors: Ethan Rand, Philadelphia, PA (US); Robert Koffsky, Hopewell Junction, NY (US)

( * ) Notice: Subject to any disclaimer, the term of this patent is extended or adjusted under 35 U.S.C. 154(b) by 67 days.

(21) Appl. No.: 12/637,957

(22) Filed: Dec. 15, 2009

(65) Prior Publication Data

US 2010/0320719 A1 Dec. 23, 2010

Related U.S. Application Data

(63) Continuation-in-part of application No. 11/461,160, filed on Jul. 31, 2006, now abandoned.

(60) Provisional application No. 60/704,214, filed on Aug. 1, 2005, provisional application No. 60/776,851, filed on Feb. 27, 2006.

(51) Int. Cl.
*B62M 1/16* (2006.01)

(52) U.S. Cl. .................................... 280/244; 280/250.1

(58) Field of Classification Search ............... 280/250.1, 280/252, 253, 243, 244
See application file for complete search history.

(56) References Cited

U.S. PATENT DOCUMENTS

| | | | | |
|---|---|---|---|---|
| 3,877,725 | A | 4/1975 | Barroza | |
| 4,354,691 | A * | 10/1982 | Saunders et al. | 280/250.1 |
| 5,577,748 | A * | 11/1996 | Dombrowski et al. | 280/244 |
| 5,988,661 | A | 11/1999 | Garfinkle | |
| 6,634,663 | B2 | 10/2003 | Mitchell | |
| 2002/0043781 | A1 | 4/2002 | Mitchell | |

OTHER PUBLICATIONS

"Pushrim Biomechanics and injury prevention in spinal cord injury: Recommendations based on CULP-SCI Investigations", Michael L. Boninger, et al., JRRD Journal of Rehabilitation Research & Development. vol. 42, No. 3, pp. 9-20.
"Propulsion Patterns and Pushrim Biomechanics in Manual Wheelchair Propulsion", Michael L. Boninger et al., Arch Phys Med Rehabil, vol. 83, May 2002, Supplement, p. 718.
"Wheelchair Pushrim Kinetics: Body Weight and Median Nerve Function", Michael L. Boninger, et al., Arch Phys Med Rehabil vol. 80, Aug. 1999, p. 910.
"Wrist Biomechanics During Two Speed of Wheelchair Propulsion: An Analysis Using a Local Coordinate System", Michael L. Boninger et al. Arch Phys Med Rehabil vol. 78, Apr. 1997.
"Relation Between Median and Ulnar Nerve Function and Wrist Kinematics During Wheelchair Propulsion", Michael L. Boninger et al., Arch Phys Med Rehabil vol. 85, Jul. 2004.
"The Meaning of Mobility for residents and Staff in Long-term Care Facilities", E.M. Bourret et al., Issues and Innovations in Nursing Practice, 2002 Blackwell Science Ltd., Journal of Advanced Nursing, 37(4) p. 338-345.
"Long-Term Wheelchair Use Leads to Stress Injuries in People with Disabilities", Bruce Taylor Seeman, Health and Science Beat, c.2000 Newhouse News Service.

(Continued)

*Primary Examiner* — Tony H. Winner
(74) *Attorney, Agent, or Firm* — Gottlieb, Rackman & Reisman, P.C.

(57) ABSTRACT

The present application pertains to a wheelchair having a frame; a seat attached to the frame and supporting a user; two lateral drive wheels mounted on essentially horizontal axes; and a propulsion system including a handle, an operating lever supporting said handle and having a friction element mounted onto the operating lever. The operating lever is movable axially with respect to one axis between a first and second position and radially. The friction element is arranged and constructed to frictionally engage said drive wheel in the first position and radial movement of the propulsion system propels the chair in a predetermined direction.

8 Claims, 10 Drawing Sheets

OTHER PUBLICATIONS

"Obesity Among Adults with Disabling Conditions" , Evette Weil et al., JAMA Sep. 11, 2002, vol. 288, No. 10 p. 1265, Downloaded from www.JAMA.com at Thomas Jefferson University on Sep. 28, 2006.
"Pushrim Forces and Joint Kinetics During Wheelcheir Propulsion", R.N. Robertson, et al., Arch Phys Med Rehabil vol. 77, Sep. 1996, p. 856.
"Trends and Differential Use of Assistive Technology Devices: United States, 1994", J. Neil Russell et al., Advance Data, U.S. Department of Health and Human Services- Center No. 292, Nov. 13, 1997.
Assistive Technology—Vibration Exposure of Individuals Using Wheelchairs Over Sidewalk Services, Erik Wolf et al., Disability and Rehabilitation, Dec. 2005; p. 1443-1449.
"Shoulder Pain in Wheelchair Users with Tetraplegia and Paraplegia," Kathleen A. Curtis, et al., Arch Phys Med Rehabil vol. 80, Apr. 1999, p. 453-457.
"The Utilization of Different Modes of Residence and Health Services", Kenneth A. Couch, from the University of Connecticut, Department of Economics and Alice Zavvacki, Center for Ecommic Studios, the U.S. Burrea of Census.
"Trends and Issues in Wheeled Mobility Technologies" Rory A. Cooper et al., Department of Rehabilitation Science and Technology, University of Pittsburgh and Human Engineering Research Laboratories, VA Pittsburgh Healthcare System.
"65 in the United States" Frank B. Hobbs et al., Current Population Reports, Special Studies, U.S. Department of Commerce, Economics and Statistics Administration, Bureau of the Census, issued Apr. 1996.
"Research Findings #4: Nursing Homes—Structure and Selected Characteristics, 1996", Jeffrey Rhoades, et al. Agency for Health Care Policy and Research and Quality, Rockville, MD. Jan. 1998.
"Assistive Technology and Information Technology Use and Need by Persons with Diabilities in the United States, 2001" Dawn Carlson, et al., U.S. Department of Eduction, National Institute of Disability and Rehabilitation Research, Aug. 2005.

* cited by examiner

ERGONOMIC WHEELCHAIR PROPULSION SYSTEM

RELATED APPLICATIONS

This application is a continuation-in-part of application Ser. No. 11/461,160 filed Jul. 31, 2006 now abandoned which claims priority to U.S. Provisional Applications Ser. No. 60/704,214 filed on Aug. 1, 2005 and 60/776,851 filed on Feb. 27, 2006, all incorporated herein by reference.

BACKGROUND OF THE INVENTION

A. Field of Invention

The present invention relates to a novel manual wheelchair (MWC) structure that enables a wheelchair user to more readily propel and brake the wheelchair in forward and rearward directions in a safe manner and with biomechanical efficiency that reduces the likelihood of injury to the user. More particularly, the application pertains to a novel manual wheel chair having an improved propulsion mechanism that can be used to move the same.

B. Description of the Prior Art

The present invention relates to a novel component for wheelchairs. The invention enables a wheelchair user to more readily propel and brake the wheelchair in forward and rearward directions in a safe manner and with biomechanical efficiency that reduces the likelihood of injury to the manual wheelchair (MWC) user. There are currently approximately two million MWC users in the United States. The vast majority of these users operate their wheelchairs according to the standard propulsion method utilizing handrims secured to the perimeter of each main wheel. By grasping the handrims and forcing their rotation, the main wheels rotate, propelling the wheelchair. Differential application of force is applied to change the lateral direction of the wheelchair. To propel a MWC according to this standard method requires that the user's wrists undergo significant flexion, extension, ulnar deviation and radial deviation, positions that are highly correlated with injury. This method of propulsion also requires that the user's shoulders undergo significant internal rotation and abduction under a large amount of force, which is greatly correlated with shoulder injuries, especially those relating to the rotator cuff.

Currently, approximately 50% of long-term, independent wheelchair users experience an upper extremity injury due to the present propulsion system. The issues associated with overuse are becoming evident mainly in the forms of muscle pain, torn rotator cuffs, tendonitis, joint degeneration, and carpal tunnel syndrome. Furthermore, the standard propulsion system requires a large amount of strength to operate, and utilizes small muscle groups that are not suitable for supporting large amounts of repetitive force. The significant force required to propel this system forces weaker users and those with less dexterity of the hand. (Over 33% of wheelchair users experience difficulty in grasping activities with their fingers and more than 31% experience difficulty in holding a pen or a pencil.) to resort to the more expensive and burdensome electric wheelchairs, or to require attendant propulsion. However, MWCs have many advantages over their electric counterparts. For instance: the MWC can be easily transported, as most weigh less and can be folded and simply placed in vehicles for transportation; physically, the MWC provides upper body exercise and helps prevent muscular atrophy; psychologically, the MWC provides increased independence and self-reliance; furthermore, in terms of cost, the MWC is significantly more affordable than its current alternatives.

SUMMARY OF THE INVENTION

The present device was invented in order to address the difficulties associated with the traditional manual wheelchair, specifically those relating to repetitive strain injuries. The propulsion system can be used for both injury prevention and rehabilitation. The invention increases the overall safety and efficiency with which a MWC user propels and brakes a wheelchair. This propulsion system addresses repetitive strain injuries, as well as hand and finger burns; blisters and calluses; difficulty in controlling the chair when the user's hands slip; injury due to small sharp objects that pack into the wheelchair's tires and cut the user's hands when propelling the wheelchair; as well as common hand injuries due to braking with or without the wheelchair's wheel-lock.

The invention seeks to improve safety and efficiency through several alterations of the traditional handrim model. It provides an improved hand propulsion system, including a operating lever, which can be easily fitted to existing wheelchairs or can be installed during manufacture of wheelchairs (i.e., standard, lightweight, ultra-lightweight, bariatric, sports, standing, and specialized wheelchairs) without significant modifications to the chair. The device does not require a new handrim or wheel for retrofitting the device onto existing chairs; however, on some models of the system, the device can incorporate a new wheel when installed during manufacturing, and if the user prefers, the handrim can remain installed on the wheelchair.

The propulsion system on the invention is easier to operate by the user than the devices suggested by previous work. The design of the device is based on ergonomic principles involving proper biomechanics and usability. It is also simpler to fabricate and requires fewer parts than many of the known hand propulsion devices. Standard, universal parts are incorporated whenever possible. Additionally, the propulsion system is easy to maintain.

In terms of adaptability, the invention is designed to function on all types and sizes of manual wheelchairs. Different models of the system are intended for the various types of MWCs available on the market. It is adaptable to fit all wheel sizes, axle diameters, hub widths, different degrees of wheel camber, as well as various dimensions and materials of handrims.

There are two main models of the device, rim and hub. On the rim drive the friction element on the operating lever engages the friction element on the wheelchair wheel around the rim of the wheel. On the hub drive, the friction element on the operating lever engages the friction element on the wheelchair wheel at the hub, located around on the axle of the wheel.

The rim drive has several embodiments that engage the wheel, handrim, or other friction element around the periphery of the wheel. The operating lever can engage the wheelchair wheel, handrim, or other friction element using friction pads, or a grip or clamping mechanism.

In the rim drive, a friction element on the operating lever is adapted to engage the friction element on the wheelchair wheel (i.e., handrim, wheel, or other friction element) when pressure is applied inward, pressing the operating lever friction element against the handrim, wheelrim, or other wheelchair wheel friction element around the periphery of the wheel. More specifically, a friction pad mounted to a backing plate is attached to the operating lever to maximize the amount of surface area in contact with the handrim, wheelrim, or other wheelchair wheel friction element, during propulsion in both the forward and reverse directions. If the operating lever is not rotated either forward or backward and a continued force is applied by the user, the wheelchair will stop due to the friction between the friction elements. The distance between the operating lever friction element (i.e., friction pad) and the wheelchair wheel friction element (i.e., handrim, wheel, or other friction element) is adjustable.

When the user wants to propel the wheelchair in the forward direction, the hand grip on the operating lever is grasped and moved axially from a first position to a second position such that the friction elements of the operating lever and the wheelchair wheel friction element (i.e., handrim, wheel, or other friction element) are engaged. While the contact is maintained, the operating lever is rotated from a top position in a direction to cause the wheelchair to advance. At the bottom of the forward stroke, the user simply releases the inward force on the operating lever, thereby causing the operating lever to pivot about the pivot point from the second position substantially back to the first position. At this time, the operating lever is then rotated back to its original position for another forward stroke. Alternatively, the same method can move the wheelchair in a reverse direction, with the wheelchair wheel friction element (e.g., handrim) being engaged with the operation lever friction element (e.g., friction pad) in the bottom position and the operation lever being rotated with the wheelchair wheel friction element engaged toward the top position. A wiper may be attached to the operating lever friction element to clean the wheelchair wheel friction element of dirt and moisture before the friction pad comes into contact with handrim, increasing the coefficient of friction between the friction pad and the handrim, and increasing the frictional contact area.

The hub drive also has several embodiments. The operating lever in this model utilizes a friction element to engage a wheelchair wheel friction element that is contained in a hub around the axle of the wheelchair wheel. The operating lever can engage the wheelchair wheel using a variety of friction elements. These friction elements include, but are not exclusively limited to a disc and caliper system; a cup and cone clutch system; a flat plate clutch system; a band and drum brake system; or an internal expanding shoe in drum brake system.

The operating lever friction element (e.g., caliper, flat plate friction pad, cone, etc) located around the axle of the wheel engages a wheel friction element, fixed to the wheelchair wheel around the axle. To engage the wheelchair wheel with the operating lever, pressure is applied inward, pressing the operating lever friction element toward the wheel friction element.

If the operating lever is not rotated either forward or backward and a continued inward force is applied by the user, the wheelchair will stop due to the friction between the friction elements. The distance between the friction elements is adjustable.

When the user wants to propel the wheelchair in the forward direction, the hand grip on the operating lever is grasped and moved axially from a first position to a second position, toward the user, such that the friction elements of the operating lever and wheelchair wheel are engaged. While the contact is maintained, the operating lever is rotated from a top position in a direction to cause the wheelchair to advance. At the bottom of the forward stroke, the user simply releases the inward force on the operating lever, thereby causing the operating lever to pivot about the pivot point from the second position substantially back to the first position. At this time, the operating lever is then rotated back to its original position for another forward stroke. Alternatively, the same method can move the wheelchair in a reverse direction, with the wheelchair wheel friction element being engaged with the operating lever friction element in the bottom position and the operating lever being rotated while engaged toward the top position.

The friction elements of hub drive are contained within a weatherproof housing and can still be used during wet, muddy, or icy weather conditions. The propulsion system includes a support system that supports the operating levers while not in use and can function as a wheel-lock (i.e., parking brake), as well. The support system can be incorporated internally into the hub of each of the drive wheels, or externally attach to the frame of the wheelchair. Both forms of the support system can use magnets, detents, clips, or other mechanisms to support and lock the operating lever in place while not in use. Additionally, both forms of support systems can be used on either rim drive or hub drive models. The external support system is either fastened to the frame of the wheelchair or can be attached to a fender which wraps around the wheel, fastening to the frame on the inside and axle on the outside. Importantly, the fender is provided with notches to hold the operating lever in rest and brake positions. The rest position is intended for resting the operating lever when not in use. This position is aligned with the disengaged position of the operating lever, to support the operating lever while not in use without applying a wheel-lock or parking brake to the wheelchair. The brake position is designed for braking or slowing the wheelchair. This position is aligned with the engaged position of the operating lever. A clasp, magnet or detent can be placed in the resting and braking positions, in order to lock the operating lever in place. Additionally, locking the operating lever in the brake position will function as a parking brake, or wheel-lock for the wheelchair. The support system can also be integrated into the wheel hub.

The support system allows the operating lever to be supported in either a front and rear position, where the operating lever can be secured while the operating lever is not in use.

The angle of the support system in relation to the position of the chair is either fixed or adjustable for user preference, depending on the drive and user needs. The lever can lock into the support system, and can easily unlock with a tug on the hand grip. The rear support is also intended to aid those with minimal trunk stability, most likely due to a spinal cord injury, by maintaining the operating lever in an accessible position. The lever can be retrieved without bending at the trunk. Additionally, the supports prevent the operating lever from coming into contact with the ground or from becoming an obstruction (e.g., fitting under tables or desks).

The described methods for MWC propulsion by the new invention limit wrist and shoulder kinematics to a safe range. The wrist will not be in a position of flexion, extension, or ulnar or radial deviation at greater than 15 degrees from a neutral position during any period of propulsion. The shoulder will be maintained in a neutral position, internal rotation is limited and the potential for abduction is minimized. The MWC user can also retain his or her grasp on the hand grip at all times. The operating lever used in the present invention is not fixed to the wheel. Consequently, the user does not have to release his or her grasp of the operating lever during propulsion. Back posture is also significantly safer when using the present invention. The user can maintain a healthy posture and sit upright. There are also hygienic benefits when using this device, caused by reduced contact of the hands with the handrim and wheel.

The handle of the operating lever has a grip that has sufficient friction, especially since a considerable force must be applied with a hand that can be perspiring heavily. The grip reduces vibration, increases comfort and avoids unnecessary compression of blood vessels in the hand. The hand grip is non-slip and compliant, or compressible. It can be adjustable for user safety, preference, and comfort level. The handle pivots around a fixed point on the end of the operating lever so as to maintain a neutral position for the wrist throughout the lever's stroke. The pivoting handle also significantly increases the length of the propulsion stroke over other levered devices, a major shortcoming of most levered propulsion systems. The pivoting handle can be fixed if hand dexterity is limited, as in some injuries or diseases.

The device's design is aesthetically unobtrusive and can decrease the functional width of the wheelchair due to the minimized internal rotation of the shoulders such that the elbows no longer protrude laterally from the side of the chair during propulsion. Therefore, using this device meets the needs of MWC users and is suitable for spaces designed according the regulations from the Americans with Disabilities Act (ADA), 1990. The height of the operating levers also does not interfere with daily activities (e.g., side transfers or dancing) and allows the chair to fit easily under tables and desks.

BRIEF DESCRIPTION OF THE DRAWINGS

FIG. 2A shows the operating lever of FIG. 2AA being pivoted axially to selectively engage the handrim;

FIG. 2*b* shows the operating lever of FIG. 2BB being pivoted axially to selectively engage the handrim;

DETAILED DESCRIPTION OF THE INVENTION

Figure 1:
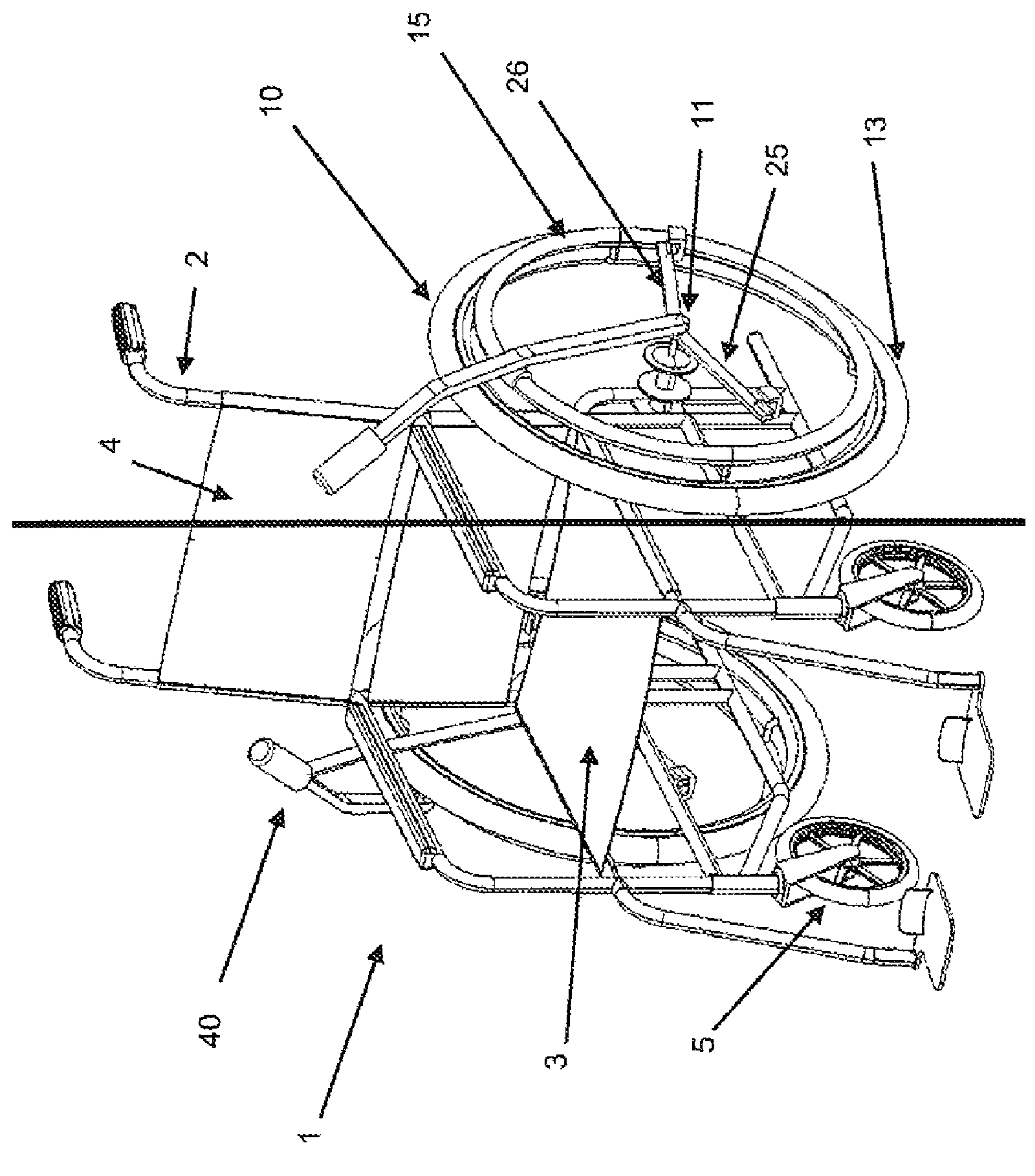
FIG. 1 shows an isometric view of a manual wheelchair (MWC) constructed in accordance with this invention with a first embodiment of the invention shown on the left side of the Figure and a second embodiment shown on the right side.

Referring now to the Figs., a manual wheelchair (MWC) 1 constructed in accordance with this invention includes a frame 2 holding a back support 4, a seat 3, two caster wheels 5 and two drive wheels 10.

Each drive wheel 10 includes an axle 11 supported by frame 2, a tire 13 and a handrim 15 that is secured to the wheel and can be grasped manually for propulsion. The tire 13 and handrim 15 are supported by the axle 11 by spokes that have been omitted for the sake of clarity. The MWC 1 can be a wheelchair modified to conform to the present invention, or can be constructed with the features of the invention integrated into the chair upon manufacturing.

As shown in the drawings, chair 1 further includes a rim drive propulsion system 40 constructed and arranged to allow a user to selectively engage or grasp indirectly the handrim 15. The rim drive propulsion system 40 includes a handle 23, covered with a hand grip 24, constructed and arranged to be gripped by a user of chair 1. The operating lever friction element for rim drive 42 may have an arcuate surface 42A sized and shaped to engage a portion of handrim 15. In the drawings, a lateral or vertical portion of the handrim is engaged. Of course the operating lever friction element for rim drive 42 can be positioned to engage other portions of the handrim, including a top or horizontal portion. The operating lever friction element for rim drive 42 can be made of a rubber material or other materials that provide an adequate coefficient of friction.

Figure 2A:
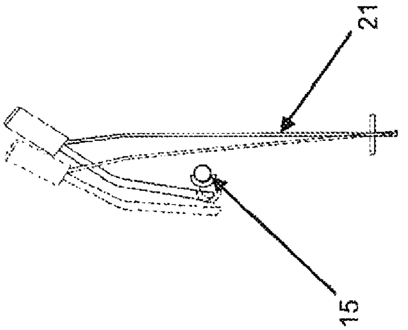
FIG. 2AA shows an isometric view of the operating lever of the first embodiment.
Figure 2A:
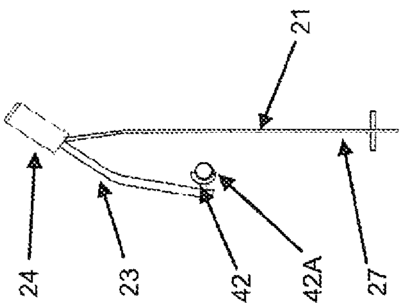
Figure 5:
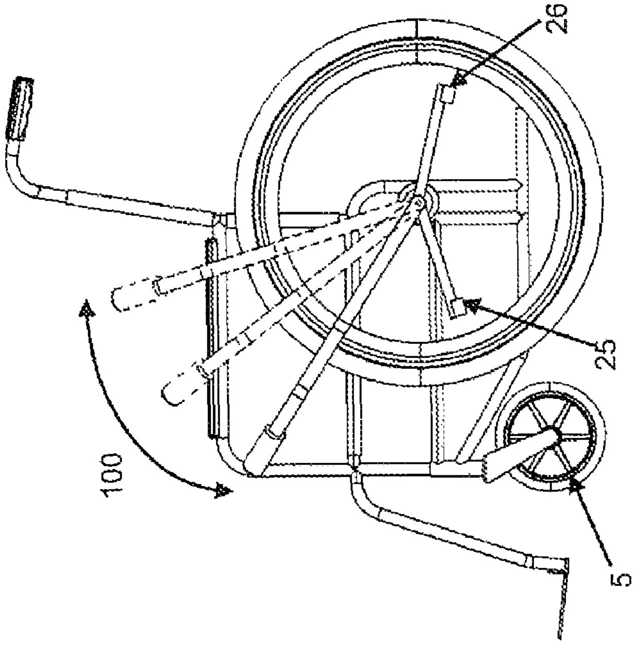
FIG. 5 shows a side elevational view of the chair of FIG. 3, indicating the movement of the operating levers for propulsion.

The rim drive propulsion system 40 further includes an operating lever for rim drive 21 having one end supporting the handle 23, and having a mounting hole 27 at the opposite end. The mounting hole 27 is sized and shaped to fit over the axle 11. Importantly, this engagement is fitted to allow the operating lever for rim drive 21 to pivot axially (as shown in FIG. 2A), to engage or disengage the propulsion system 40, and radially with respect to the axle 11, as shown in FIG. 5, in order to propel or retract the operating lever for rim drive 21. The operating lever for rim drive 21 can have an oval or circular cross section, or alternatively, it can have a flat configuration.

Figure 2B:
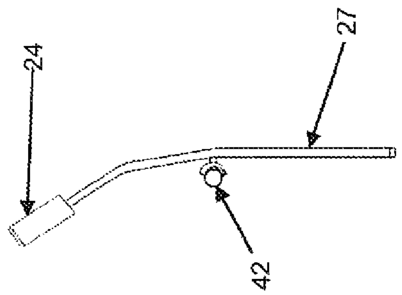
FIG. 2BB shows an isometric view of the operating lever of the second embodiment.
Figure 2B:
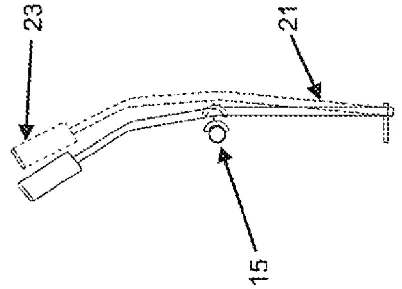

In the embodiment shown in FIG. 2A, 2AA the rim drive propulsion system 40 consists of handle 23, operating lever friction element for rim drive 42 and operating lever for rim drive 21. Two such levers are provided, one on each side of the chair. In this embodiment, the operating lever for rim drive is shown inside the drive wheel 10. In another embodiment, the operating lever for rim drive 21 is positioned outside the drive wheel 10, as shown in FIGS. 2B, 2BB. Of course, chair 1 is provided with two operating levers that are either inside or outside the respective wheel.

Figure 4:
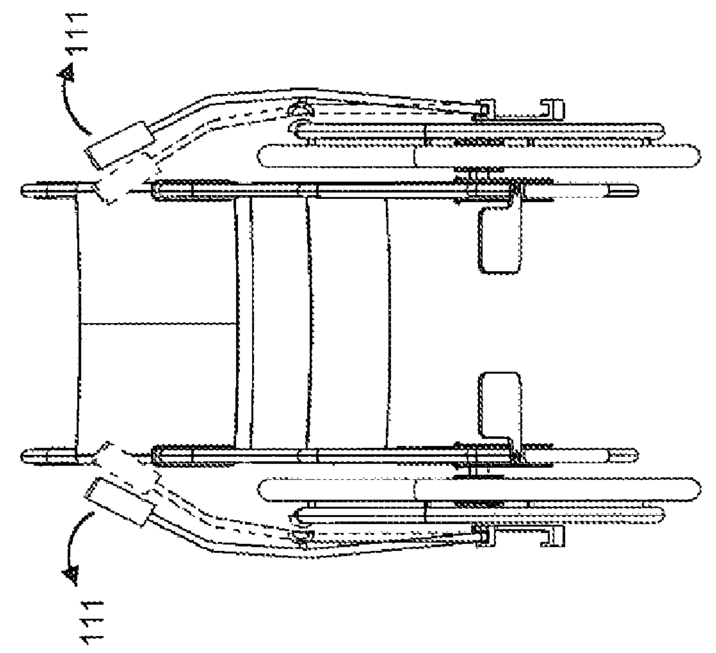
FIG. 4 is similar to FIG. 3 with the operating levers being pivoted toward an open, or disengaged position.
Figure 3:
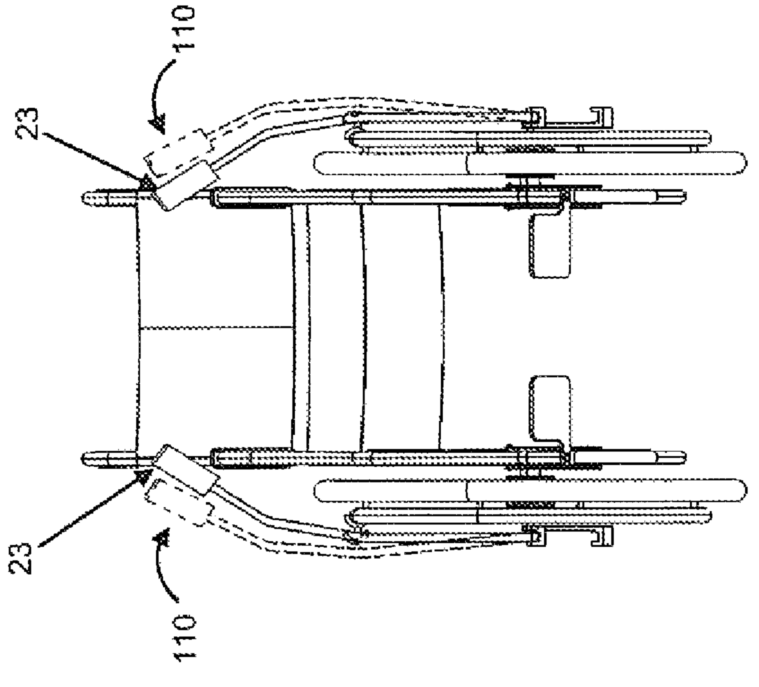
FIG. 3 shows a front elevational view of a MWC built in accordance with the first embodiment with the operating levers being pivoted toward the operational position.
Figure 6:
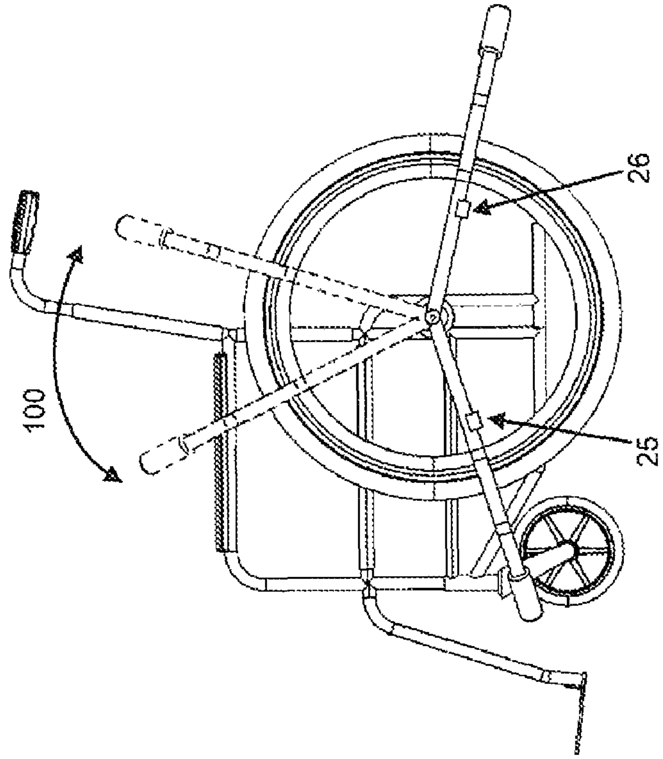
FIG. 6 is similar to FIG. 5 and shows the position of the operating levers in a rest position.

In FIGS. 3-6 the operating lever is shown outside the wheel. Referring to FIGS. 3-6, the propulsion member 40 is used as follows. Initially, the operating lever for rim drive 21 is positioned away from the wheel. In order to actuate the member, a user pivots the operating levers axially by drawing the handles 23 in, as indicated by arrows 110 in FIG. 3. In this position, the operating lever friction elements for rim drive 42 engage handrims 15. Next, the user pivots the operating levers with respect to the axles, as shown in the arrow 100 in FIG. 5. A clockwise motion in FIG. 5 causes the chair 1 to go backwards, a counterclockwise motion causes the chair to go forward. At the end of the stroke, the user disengages the operating levers as shown in FIG. 4 by arrows 111 and pivots the operating levers for a new stroke.

Preferably, the operating levers for rim drive 21 are placed in a rest position when not in use. This can be accomplished by pivoting them until they rest on either a front support 25 or a rear support 26.

Figure 7A:
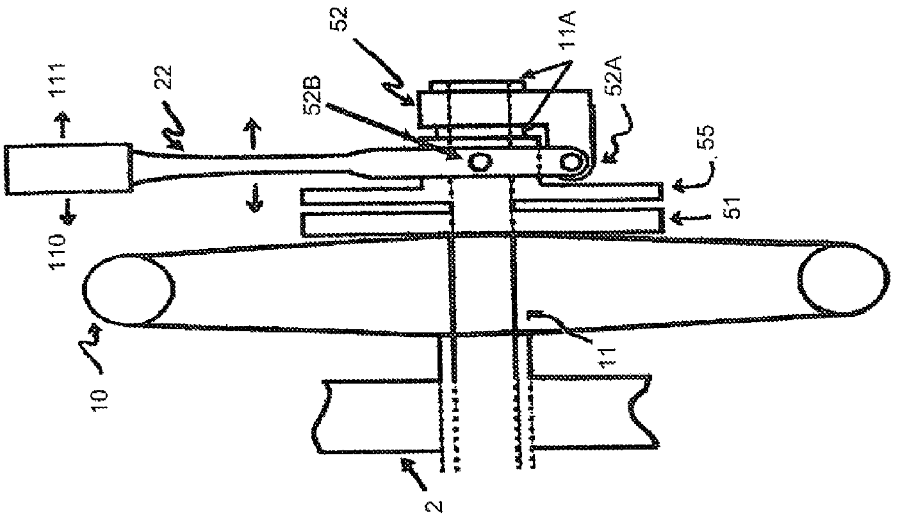
FIG. 7A shows in a cross sectional view of details of an implementation of the structure shown in FIG. 7.
Figure 7:
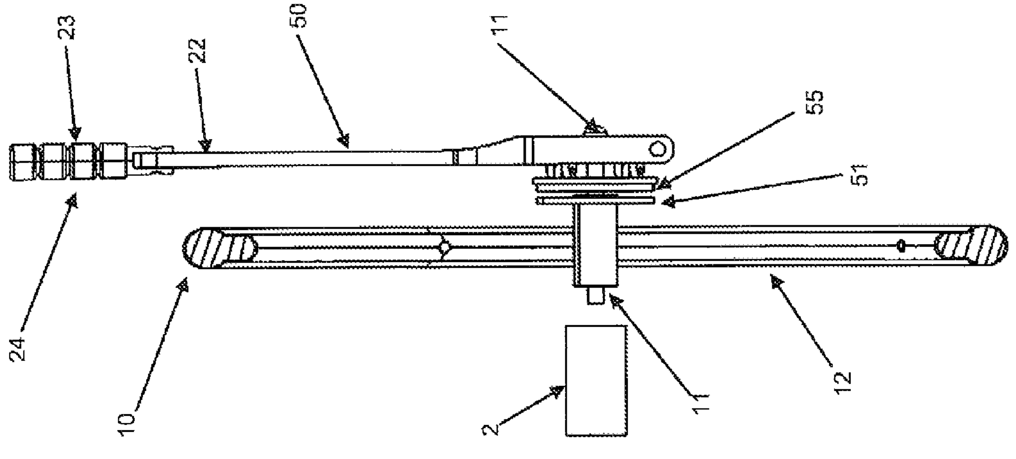
FIG. 7 shows an elevational cross-sectional view of a MWC wheel driven by the hub drive using a disc-type drive with the discs being separated.
Figure 9:
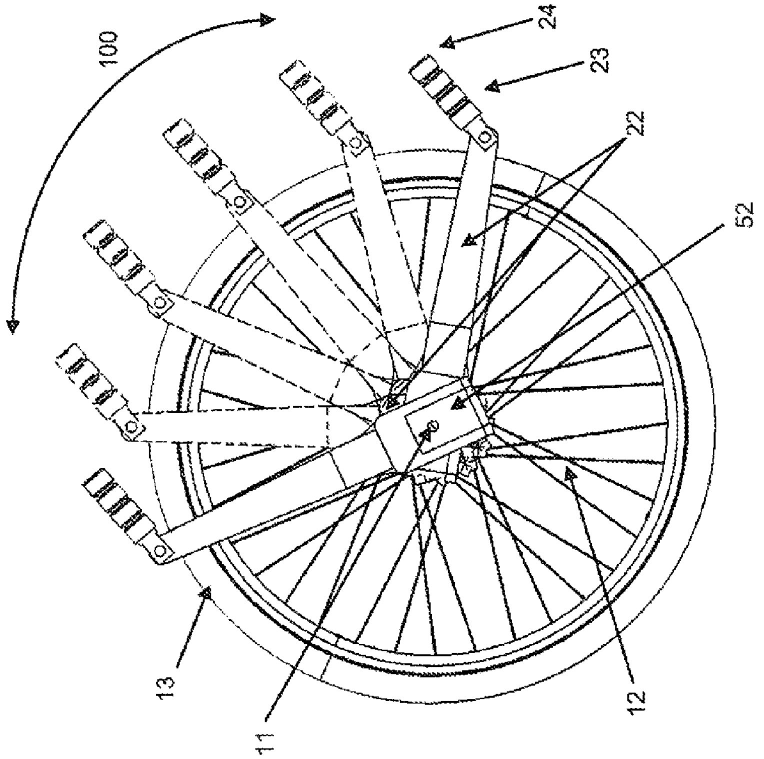
FIG. 9 shows the various positions of the operating lever with its pivoting handle during propulsion for the embodiment of FIGS. 7 and 8.
Figure 8:
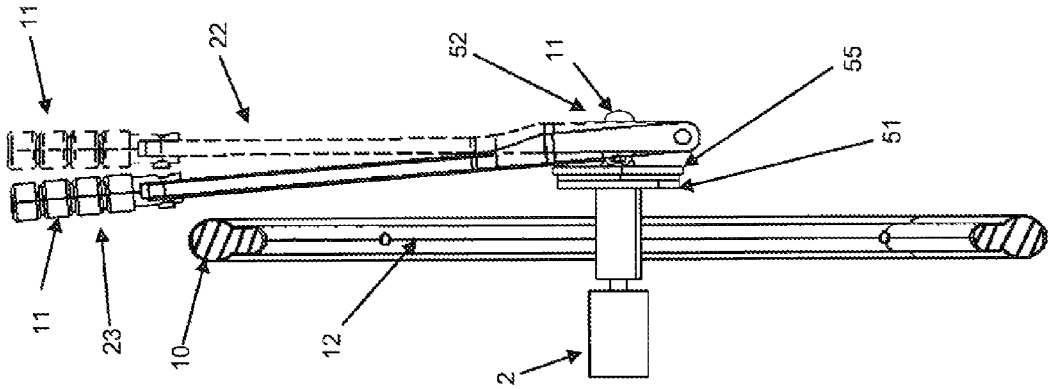
FIG. 8 shows view similar to the one in FIG. 7 with the discs being in contact with each other for providing either propulsion or braking.

FIGS. 7-9 show a MWC with a disc-type, hub drive. FIG. 7A shows in detail an embodiment with a lever mounting block 52, an axle 11 and an operating lever 22. The fork shaped end of the operating lever 22 is mounted onto the lever mounting block 52, which fits around axle 11. The block 52 is shaped and constructed so that the operating lever can pivot both axially and radially with respect to frame 2 and is restrained axially outwardly by two locknuts 11A. This assembly is especially visible in FIG. 7A. The MWC further includes two disc-shaped friction elements 55 and 51. Disc-shaped friction element 51 is rotationally secured to the drive wheel 10 while disc-shaped friction 55 is secured to operating lever 22. In FIGS. 7 and 7A the two discs 51, 55 are shown separated, or disengaged. When a user of the wheelchair would like to either move or brake the movement of the respective chair, he or she axially pivots the operating lever 22 in direction 110 so that the two discs 51, 55 come into contact. If the drive wheel 10 is rotating, this contact causes friction and braking forces to brake the drive wheel 10 and slow down the MWC. (Of course, FIG. 7—show the drive for one side of the MWC, it being understood that preferably an identical arrangement is provided on the other side so that the MWC can be brought to halt by using both hands, one on each of the levers 22). Conversely, if the drive wheel 10 is rotating, slowly or is stopped, then the operating lever 22 is pivoted to engage the two disc 50, 51 in the direction 110 and the lever is then pivoted forward or backward axially. Once the end of a stroke is reached, the lever is pivoted axially outwardly in the direction 111 to cause the two disks to disengage. In this manner the lever 22 is then pivoted in and out and back and forth causing the wheel to rotate. FIG. 9 shows the various positions of the operating lever 22 and the radially pivoting handle 23 while it propels the MWC. Due to the radially pivoting lever 22, the user maintains a long propulsion stroke, as seen in FIG. 9, unlike other levered propulsion systems that have a much shorter stroke. Note that the pivoting handle 23, does not pivot axially, in order to provide the user with proper support. As in rim drive, the operating lever 22 can have an oval or circular cross section, or alternatively, it can have a flat configuration.

During the operation just described block 52 maintains its axial position on axle 11. The lever 22 is pivotable connected at points 52A and 52B to the block 52 and disk 55 so that the pivoting of lever in the axial directions 110, 111 causes the disc 55 to move axially toward or away from disc 51 as described.

Figure 10A:
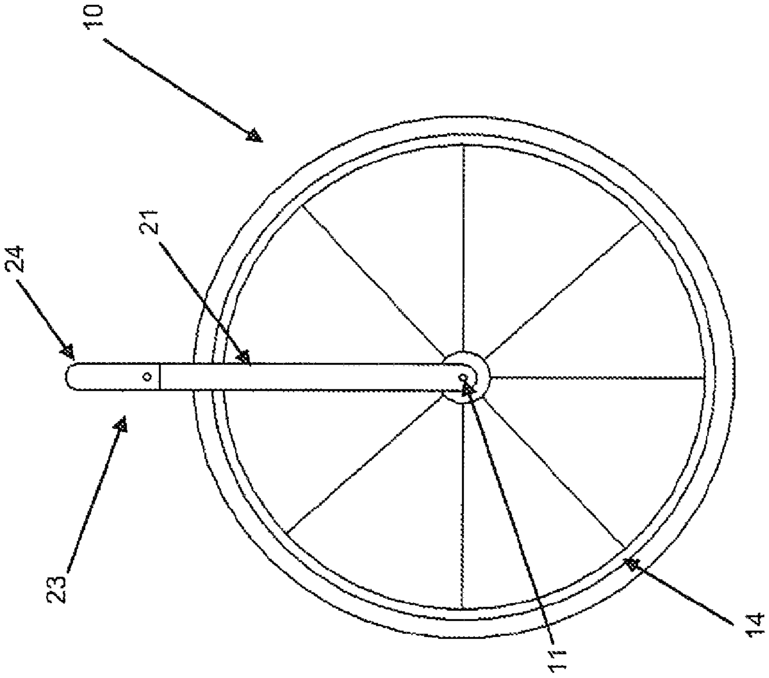
FIG. 10A shows an elevational view of MWC wheel.
Figure 10B:
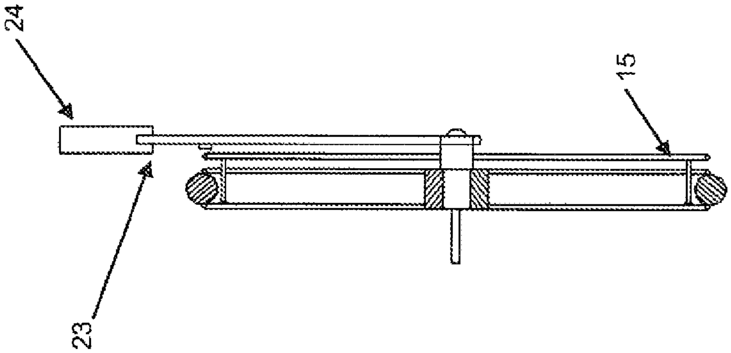
FIG. 10B shows the engagement with the hand rim
Figure 10C:
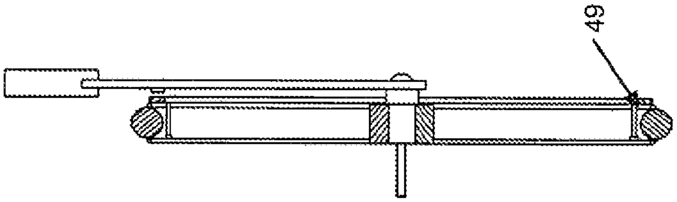
FIG. 10C shows the engagement with the wheelrim.
Figure 10D:
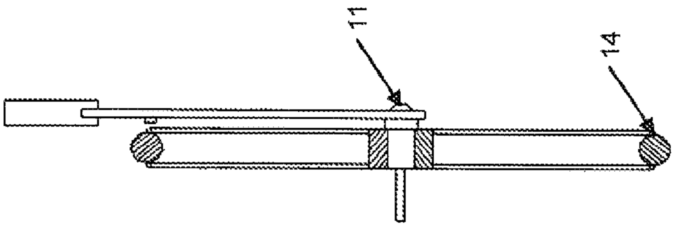
FIG. 10D shows the engagement with a large diameter disc.

Of course, other means of engaging the wheel and selectively applying braking or propelling forces may be used. For example, in FIG. 10A, a drive wheel 10 is shown with a handrim and a wheelrim 14 disposed behind the handrim. As shown in FIGS. 10B and 10D, the operating lever for rim drive 21 is formed with the operating lever friction element for rim drive 42 shaped and arranged so that it selectively comes into contact with either the handrim or the wheelrim.

Alternatively, as shown in FIG. 100, the wheel is provided with a relatively large diameter disc friction element 49 and the operating lever for rim drive 21 is used to either apply a brake to the wheel through operating lever friction element for rim drive 42, or to propel the wheel by bringing the operating lever for rim drive friction element 42 into contact with disc friction element 49.

Figures 11A, 11B, 11C:
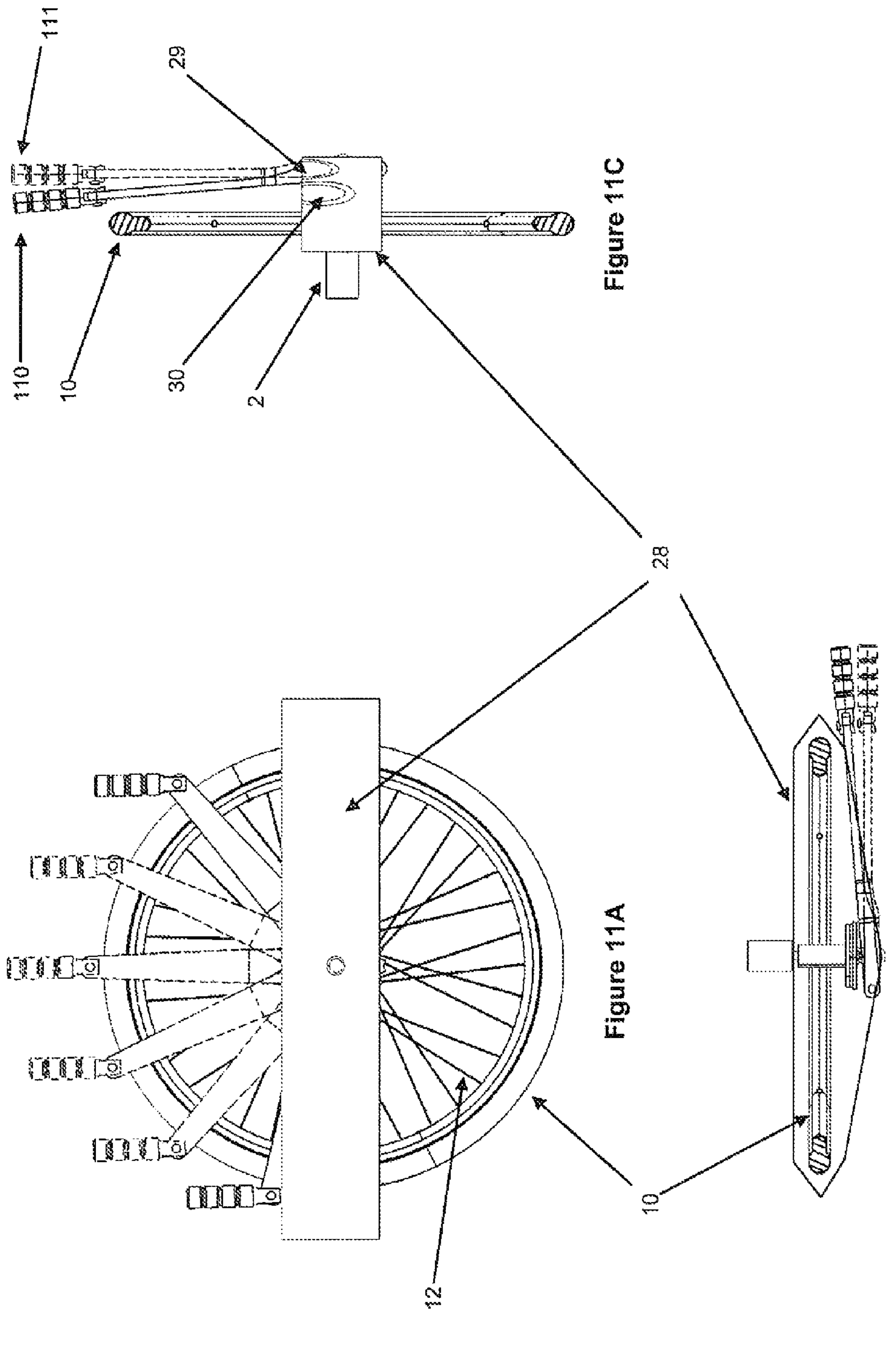
FIGS. 11 A, 11B, 11C show respectively the side elevational, front elevational and top views of a wheel with an operating lever and a fender external support system.

FIGS. 11A, 11B and 11C show another embodiment. In this embodiment a drive wheel 10 is provided with a fender for protecting the wheel and for acting as an external support. An operating lever for hub drive 22 is used to propel or brake the wheel in any one of the configurations desired. Importantly, the fender 28 is provided with notches 29 and 30. The operating lever 22 can be placed in the rest position 29 for resting the operating lever 22 when not in use, or in the brake position 30 for braking or slowing the wheelchair 1. The rest position 29 is aligned with the disengaged position of the operating lever 22, to support the operating lever while not in use without applying a wheel-lock or parking brake to the wheelchair. On the other hand, the brake position is aligned with the engaged position of the operating lever 22. A clasp, magnet or detent can be placed in the resting and braking positions, in order to lock the operating lever in place, as in the support system embodiment in FIG. 15. Locking the operating lever in brake position 30 will function as a parking brake, or wheel-lock for the wheelchair.

Figure 12:
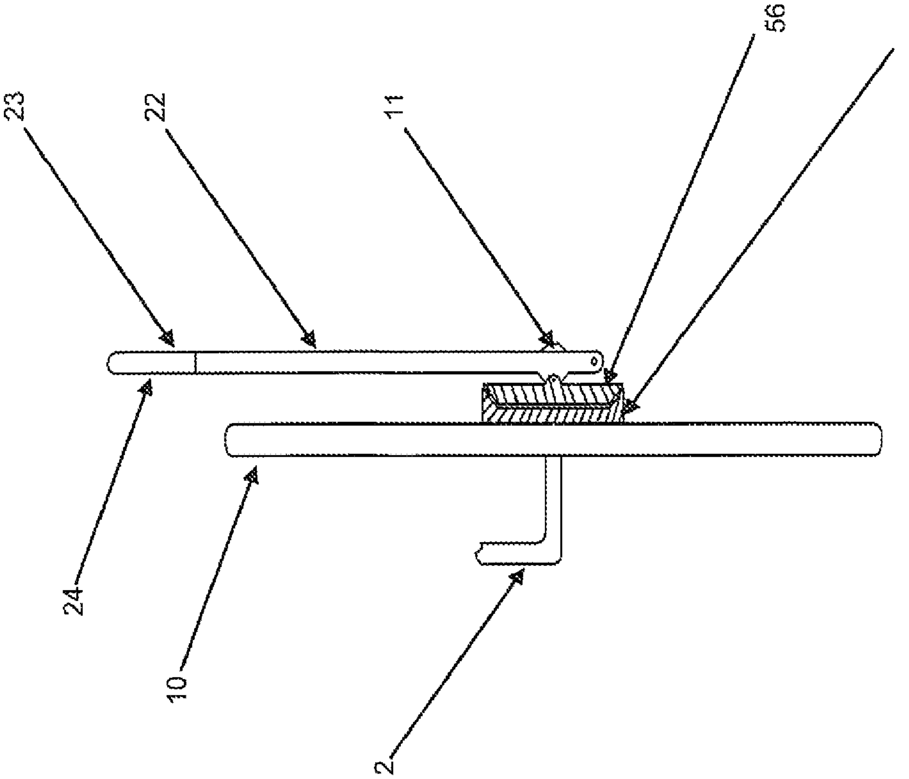
FIG. 12 shows an alternate embodiment wherein a conical friction coupling is used for propulsion or braking.

FIG. 12 shows another embodiment of the invention. In this embodiment a drive wheel 10 is mounted on an axle together with friction element with conically shaped cup 54. The friction element with conically shaped cup 54 is rotationally locked to the wheel. As in FIG. 7-9, the fork shaped bottom of the operating lever 22 is mounted onto the lever mounting block 52, which fits around axle 11 so that the operating lever can pivot both axially and radially with respect to frame 2. Please note that this assembly is especially visible in FIG. 9. In this embodiment of the hub drive, the operating lever for hub drive 22 is provided with a conical friction element 56 attached to the operating lever 22, that is complementary to the cup of the friction element with conically shaped cup 54. When the conical friction element 56 is pressed axially against friction element 54, they come into contact with each other and cause the wheel to slow down, or to propel the wheel as desired.

Figure 13:
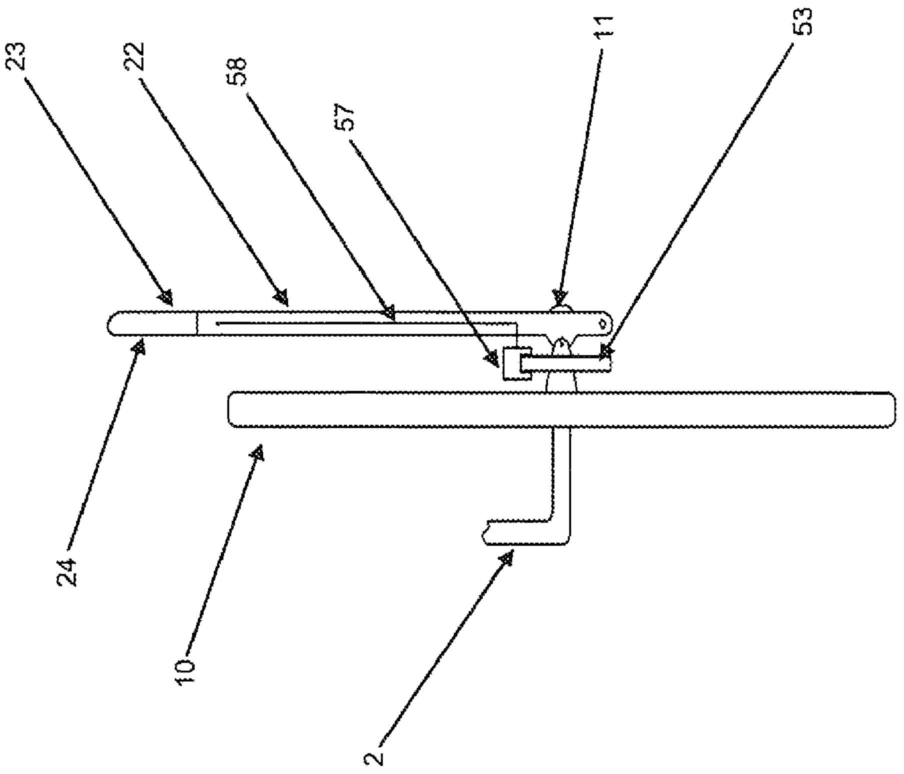
FIG. 13 shows an alternate embodiment wherein a caliper arrangement is used for propulsion and braking.

In the embodiment of FIG. 13, a drive wheel 10 on axle 11 is provided. The wheel also has a disc friction element 53 for use with caliper. The hub drive propulsion system 50 is also mounted on the axle 11 and it carries a caliper 57 similar to the caliper used for braking bicycles. The caliper is activated axially with respect to the disc friction element 53 by a cable 58 that in this embodiment is mounted onto or inside (not shown) the operating lever for hub drive 22. By pivoting the operating lever for hub drive 22 axially the cable tightens, pulling on caliper 57, thus causing the caliper to squeeze the disc friction element 53.

Normally, the caliper 57 is positioned with respect to the disc friction element 53 so that there is no contact therebetween. When the cable 58 is pulled, the caliper has a pair of pads (not shown) that advance toward and engage each side of disc friction element 53 thereby providing braking or propulsion as desired.

Figure 14:
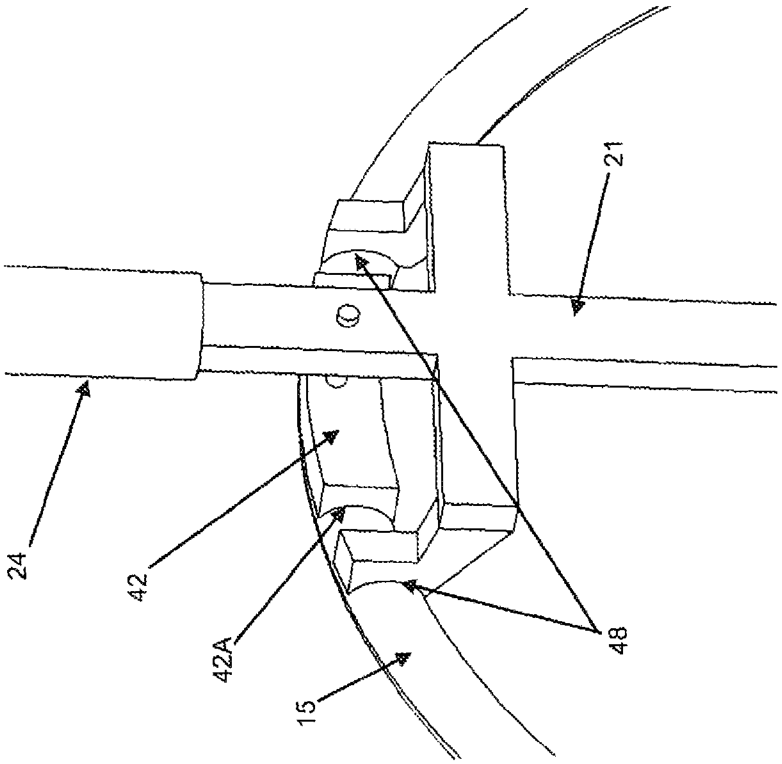
FIG. 14 shows a wiper cleaning system that increases the amount of friction for the rim drive.

FIG. 14 shows the rim drive propulsion system 40 engaging handrim 15 with wipers 48 fore and aft the operating lever friction element 42. The wipers 48 clean the surface of handrim 15 when the rim drive propulsion system is engaged and pivoted radially, increasing the amount of friction between the handrim 15 and friction element 42. Of course, the same wipers 48 can be used on the embodiments found in FIG. 10C and FIG. 10D.

Figure 15:
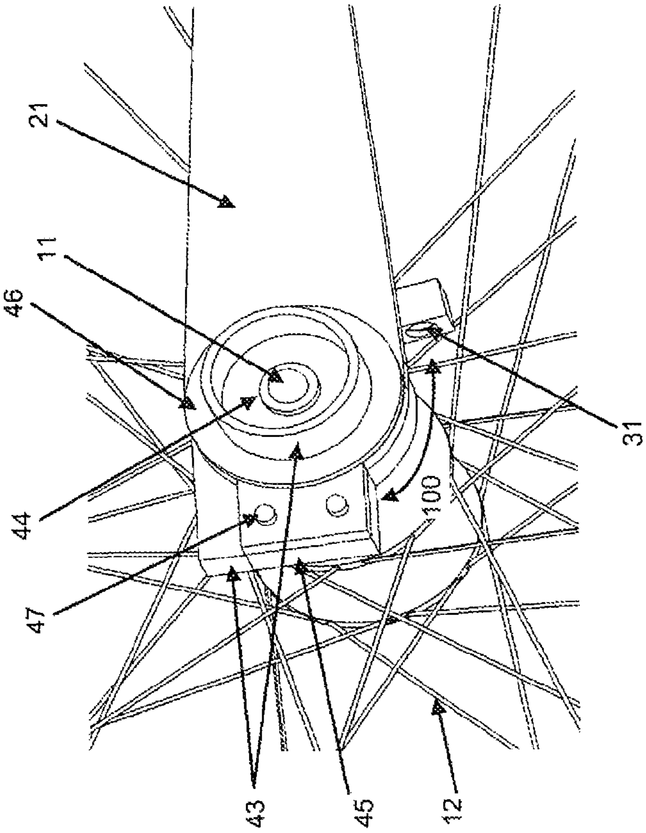
FIG. 15 shows an embodiment of the internal support system for the operating lever.

FIG. 15 shows an isometric view of an embodiment of the internal support system. An axle adapter support unit (with front and rear support) 43 is mounted onto axle 11 with axle lock nut 44, on drive wheel 10, with spokes 12. The axle adapter support unit has support locks (magnets) 31 embedded into the front and rear supports. The operating lever 21, with a ferrous block 45, mounted onto the its bottom end with ferrous block mounting screws 47, is placed onto the axle adapter support unit, on which it can rotate radially as shown by arrow 100. After the operating lever 21 is placed on the axle adapter support unit 43 a thrust washer 46 is placed on the unit 43 over the operating lever. When the operating lever is rotated radially 100, the ferrous block 45 comes into contact with the magnetic support locks 31 on the front or rear supports, the operating lever 21 is locked in place. The operating lever 21 can be released by opposing the magnetic force and rotating the operating lever radially toward the opposite support.

The subject invention has several advantages over the prior art:

Neutral Positions of Joints—The arrangement of the propulsion member limits wrist and shoulder kinematics to a safe range because:

a. The wrist will not be in a position of flexion, extension, or ulnar or radial deviation at greater than 15 degrees from a neutral position during any period of propulsion.

b. The shoulder will be maintained in a neutral position, internal rotation and abduction will be minimized to safe limits.

The propulsion member is a simpler mechanism to fabricate (requires fewer parts), install and maintain a. Does not require a new handrim or wheel b. Existing MWCs can be easily retrofitted.

c. Adaptable to any conventional MWCs (standard, lightweight, ultra-lightweight, bariatric, sports, standing, and specialized)

The propulsion member is simpler to operate: Operating levers are adapted to engage the handrim when pressure is applied inward, engaging a clutch that fixes the lever to the wheel because it mimics the fine gradient of force differential applied by the human hands during propulsion. For instance when riding on a sidewalk with a slight incline, one hand is pushing more than the other. The variations in force applied while pushing the lever against the handrim serve to provide the same flexibility in use.

Does not preclude the traditional (manual) manipulation of the handrim (but, does not require it for the system to function properly).

a. Since the main cause of injuries from wheelchair propulsion are due to significant periods of forward and reverse motion, there is no need to preclude the use of the handrim completely, when it is used for other purposes. For instance, when performing a "wheelie" maneuver, in order to transverse a curb or single step;

Support system—front and rear stops that support the arms are included where the operating lever can be secured during periods of handrim propulsion or while seated.

The operating lever can lock into the support system that is either built internally into the hub of the system or is externally attached to the frame of the wheelchair. The lever can easily unlock with a tug on the handle while the device is not in use.

Because of its unique support system, the weight of the chair in minimized and does not require a counterbalance system to restore the lever to a neutral, balanced position.

The rear support is also intended to aid those with minimal trunk stability, most likely due to a spinal cord injury, by maintaining the operating lever in an accessible position. The lever can be retrieved without bending at the trunk. The support arms prevent the operating lever from coming into contact with the ground.

Width of the Chair—The sleek design is aesthetically unobtrusive and can even decrease the functional width of the wheelchair. With minimized internal rotation of the shoulder, the elbows no longer protrude laterally from the side of the chair during propulsion and may even reduce the functional width of the chair. Therefore, using this device meets the needs of MWC users and is suitable for spaces designed according the regulations from the Americans with Disabilities Act (ADA), 1990. The height of the operating levers also does not interfere with daily activities (e.g., side transfers or dancing) and still allows the chair to fit under tables and desks without a problem.

Feedback—Unlike some of the other devices, the feedback when using this device is significantly improved. With a geared system or a power-assist machine (small stroke with the hand gets translated into larger movement), it is not intuitively clear how much a user needs to push to achieve a certain movement. Other devices even reverse the movement, where a pull actually pushes you forward. With this invention the distance that you push the chair is the distance that the user moves forward. This is more intuitive and will lead to fewer errors/accidents.

Length of Propulsion Stroke—The handle pivots around a fixed point on the end of the operating lever so as to maintain a neutral position for the wrist throughout the lever's stroke. The pivoting handle also significantly increases the length of the propulsion stroke over other levered devices, a major shortcoming of most levered propulsion systems.

Obviously numerous modifications may be made to this invention without departing from its scope as defined in the appended claims.

We claim:

1. A wheelchair comprising:

a frame;

a seat attached to the frame and supporting a user;

two lateral drive wheels including a first and a second drive wheel mounted on essentially horizontal axes; and at least one propulsion system including a handle, an operating lever supporting said handle and having a friction element mounted onto the operating lever, and being mounted at another end on one of said axes, said operating lever being movable axially with respect to said one axis between a first and second position and radially, said friction element being arranged and constructed to frictionally engage said first drive wheel in said first position;

wherein when said operating lever is in said first position, radial movement of said propulsion system propels said chair in a predetermined direction.

2. The wheelchair of claim 1 wherein the at least one propulsion system comprising two propulsion systems, each propulsion system engaging one of said drive wheels.

3. The wheelchair of claim 1 wherein said first drive wheel includes a wheelrim and said friction element engages said wheelrim.

4. The wheelchair of claim 1 wherein said first drive wheel includes a handrim and said friction element engages said handrim.

5. The wheelchair of claim 1 wherein said first drive wheel includes a disc disposed radially around said one axis and said friction element engages said disc.

6. The wheelchair of claim 1 wherein said friction element is arcuate.

7. The wheelchair of claim 1 wherein said friction element is disc-shaped.

8. The wheelchair of claim 1 wherein frictional engagement is provided between said operating lever and said first drive wheel using a conical structure.

* * * * *